United States Patent [19]

DiBattista et al.

[11] 3,962,123

[45] June 8, 1976

[54] PHENOLIC ANTIOXIDANT AQUEOUS DISPERSIONS

[75] Inventors: Anthony DiBattista, Eastchester; Ambelal Patel, Dobbs Ferry, both of N.Y.

[73] Assignee: Ciba-Geigy Corporation, Ardsley, N.Y.

[22] Filed: May 20, 1974

[21] Appl. No.: 471,410

[52] U.S. Cl. .......................... 252/400 A; 252/404; 252/406; 260/45.95 R; 252/403
[51] Int. Cl.$^2$ .............. C09K 15/32; C09K 15/08; C09K 15/10; C08K 5/05
[58] Field of Search ............... 252/400 A, 404, 406; 260/473 A,

[56] References Cited
UNITED STATES PATENTS

| | | | |
|---|---|---|---|
| 3,035,015 | 5/1962 | Spacht | 252/404 |
| 3,247,240 | 4/1966 | Meier | 252/404 |
| 3,285,855 | 11/1966 | Dexter | 252/404 |
| 3,330,859 | 7/1967 | Dexter | 260/473 A |
| 3,408,308 | 10/1968 | Waterman | 252/404 |
| 3,459,704 | 9/1969 | Peterson | 252/404 |

*Primary Examiner*—Benjamin R. Padgett
*Assistant Examiner*—Donald P. Walsh
*Attorney, Agent, or Firm*—Charles W. Vanecek

[57] ABSTRACT

A stable phenolic antioxidant dispersion is prepared by adding, with high speed stirring, a melt of a phenolic antioxidant, which is an alkyl ester of a carboxylic acid containing an alkylhydroxyphenyl group, and a fatty acid to an aqueous solution of a base capable of forming a soap with said fatty acid.

The dispersion may also be prepared by adding, with high speed stirring, a melt of the phenolic antioxidant to water, where either or both of the antioxidant and water contain an anionic or nonionic surfactant.

These aqueous dispersions are useful in the stabilization of substrates which are better stabilized with water dispersible antioxidants against oxidative degradation induced by heat and/or light.

12 Claims, No Drawings

PHENOLIC ANTIOXIDANT AQUEOUS DISPERSIONS

BACKGROUND OF THE INVENTION

The present invention pertains to phenolic antioxidant dispersions with high shelf storage stability and to the process for producing the same.

In the prior art, there is described a procedure for preparing dispersions of the polymer stabilizer, N-phenyl-N'(1,3-dimethylbutyl)-p-phenylene diamine, in a system which additionally contains oleic acid, sodium hydroxide, and water. This system is deficient in that the system has only limited shelf storage stability. Moreover, due to the high coloration of the above diamine, its dispersions have only limited applicability, e.g., in carbon black loaded resins or rubber applications or other applications in which good color performance is not required. We have now surprisingly found that dispersions of certain non-staining phenolic antioxidants, after preparation in accordance with a procedure suggested for the above diamine, are stable for a much longer period of time than the prior art diamine dispersions. Furthermore, they are suitable in applications where good initial color is required.

In U.S. Pat. No. 3,408,308, there are described emulsion concentrates of water-immiscible liquid antioxidants which are said to be remarkably stable. The antioxidants utilized in U.S. Pat. No. 3,408,308 are liquids and the order of addition of components in the preparation of the emulsion concentrates is taught to be critical, i.e., a mix of water and a fatty acid must be added to a mix of water, soap-forming base and a liquid antioxidant. The resulting product is a stable water-in-oil emulsion concentrate containing 90–95% active material (antioxidant) and is capable of self-emulsification upon dilution with water and inversion to form a stable oil-in-water emulsion. It has now been discovered that extremely stable dispersions of specific phenolic antioxidants can be prepared through the presently described technique which is applicable to solid antioxidants and in which a different method and order of component addition from that taught in U.S. Pat. No. 3,408,308 is followed.

Among techniques presently known for the preparation of emulsions or dispersions of solid antioxidants are the formation of a. aqueous dispersions by ball milling or grinding with the use of dispersing agents and b. emulsions through an initial dissolution of the solid antioxidant in a suitable organic solvent such as xylene, toluene, a phosphite such as tris-nonylphenyl phosphite, a plasticizer such as dioctylphthalate, or some other organic vehicle.

The present invention has the advantage in that it obviates the need both for any ball milling, grinding and for any organic solvent. The absence of organic solvents in the preparation of the instant dispersion is particularly noteworthy in view of the many disadvantages associated with the use of such solvents, e.g., difficulty of removal, possible adverse effect on substrate, additional cost, flammability, ecological problems, etc.

DETAILED DISCLOSURE

The present invention provides a stable composition of a colorless non-staining phenolic antioxidant of known effectiveness in stabilizing many organic substrates normally subject to oxidative deterioration. The phenolic antioxidants utilized in the present invention are represented by the formula

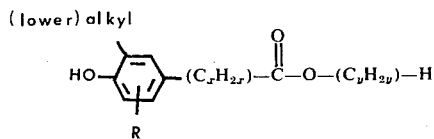

wherein R is H or (lower)alkyl, $x$ has a value of from 0 to 6 inclusively and $y$ has a value of from 6 to 30 inclusively.

Particularly useful compounds of the above class are those of the formula

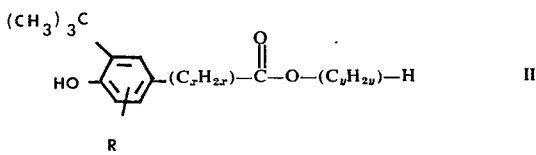

in which $x$ is 0 to 3 and $y$ has a value of from 12 to 30.

Within this group the preferred species may be represented by the formula:

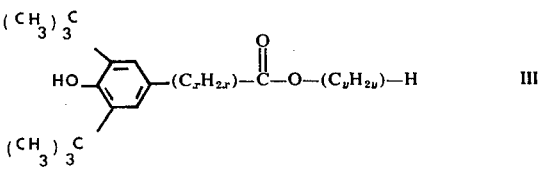

in which $x$ has a value of from 0 to 2 and $y$ has a value of from 12 to 18.

The bracketed hydrocarbon content appearing in the above formulae I to III, as e.g., $(C_yH_{2y})$, may be a branched or straight chain hydrocarbon chain. Representative of such chains are methyl, ethyl, n-propyl, n-butyl, t-butyl, n-octyl, t-octyl, 2-ethylhexyl, decyl, dodecyl, tetradecyl, octadecyl, eicosyl, etc.

By the term "(lower)alkyl" is intended a branched or straight chain hydrocarbon of from 1 to 6 carbon atoms.

It will be observed, that the di(lower)alkylphenolic moiety in Formula I exhibits at least one (lower)alkyl group in a position ortho to the hydroxy group. The other (lower)alkyl group is either (a) in the other position ortho to the hydroxy group or (b) meta to the hydroxy group and para to the first (lower)alkyl group. Although not so limited, these (lower)alkyl groups are preferably branched groups such as t-butyl. Other arrangements, such as for example a 3-t-butyl-6-methyl-p-phenolic moiety, are however clearly envisioned.

The phenolic antioxidants of the present invention may be prepared by procedures described in U.S. Pat. No. 3,330,859.

According to the present invention:
a. there is prepared
  i. an oil phase by heating together a phenolic antioxidant of Formula I and a fatty acid to form a melt, and
  ii. a water phase by dissolving a soap-forming base, e.g., sodium, potassium or ammonium hydroxide, triethanolamine and dimethylamine, in water; and
b. the oil phase is then added to the water phase which is vigorously stirred and is maintained at a temperature above the temperature of the oil phase melt;
c. stirring is continued for a brief period; and
d. the resulting mixture is cooled to approximately room temperature using a water bath or other cooling device with occasional stirring.

In the above process, the moles of fatty acid and soap-forming base are employed in approximately stoichiometric amounts. An emulsifying agent is formed in situ from the acid and base. The emulsifying agent formed is present in an amount from 2 to 30% by weight, preferably from 5 to 15%, of the phenolic antioxidant.

As an alternative to the above procedure, wherein a fatty acid soap is formed in situ, anionic or nonionic surfactants may be employed. This method is essentially the same as the above procedure except that instead of fatty acid and base, either or both of the oil phase and the water phase contain an anionic or nonionic surfactant. The anionic or nonionic surfactant is present in an amount from 1 to 30% by weight, preferably 3 to 10%, of the phenolic antioxidant.

It is critical that the oil phase in either of the above methods be in the liquid state (molten) as it is added to the water phase. Furthermore, the water phase temperature must be higher than the melting point of the oil phase. In practice, 5° to 10°C higher than melt has been found to be satisfactory, although even higher temperatures may be employed. Although the oil phase can be added to the water phase rapidly, in general, it is recommended it be added slowly to the water phase, which is agitated by means of high speed stirring, provided by a high speed mixer, such as a Greves mixer. The addition is normally made over a period of 1 to 5 minutes and preferably 1 to 2 minutes. After addition of the oil phase is completed, stirring is continued for a brief period of time, as for example for 1 to 3 minutes extra. Then, with stirring being continued, the resulting emulsion is cooled to approximately 20°–25°C. Upon cooling, the molten oil phase droplets of the emulsion solidify, and a fine dispersion of phenolic antioxidant in water results.

The amount of the water in the dispersion is chosen so that the final concentration of phenolic antioxidant in the dispersion is from 10 to 80%, preferably from 50 to 70%. While distilled water is preferred, any type of water in which the mineral or particulate content does not cause premature breakdown of the dispersion is intended to be within the scope of the invention, as for example, deionized water. Certain tap waters and/or rain water may also be suitable without purification.

The emulsifying agent formed in situ above may be a water-soluble metallic or amine salt of a fatty acid having from 12 to 30 carbon atoms, preferably from 12 to 18 carbon atoms, i.e., soaps, including the potassium, sodium, ammonium, triethanolamine and dimethylamine salts of organic acids which occur commonly in fats and oils. Examples of organic acids suitable in the formation of the emulsifying agent are oleic, lauric, myristic, palmitic, stearic, linoleic, linolenic, ricinoleic, tall oil (a fatty acid resinous by-product of the manufacture of alkaline paper pulp and containing a natural mixture of acids related to abietic and oleic acid), Neofat 42-12 (a commercial fractionated tall oil comprising oleic acid 46%, linoleic acid 39%, linolenic acid 3% and rosin acid 12%) and other fatty acid mixtures.

Examples of anionic surfactants which may be used in the invention are sodium oleate, ammonium lauryl sulfate, sulfonated lauryl alcohol (sodium salt), triethanol amine stearate, and dioctyl sodium sulphosuccinate. Examples of nonionic surfactants which may be used are fatty alcohol ethoxylates, ethylene oxide/oleic acid condensates, ethylene oxide/nonyl phenol condensates, oxyethylated alkylphenol, ethoxylated sorbitan fatty acid esters, diglycol oleate, glyceryl monolaurate, glyceryl monooleate, pentaerythritol oleate, polyoxyethylene oleate, sorbitan monooleate, diethylene glycol monooleate, propylene glycol monolaurate, modified ethylene oxide condensates, ethylene oxide condensates and oxyethylated alkylphenol.

The present invention provides a stable composition of a phenolic antioxidant which is known to be an effective stabilizer in many substrates (see, e.g., U.S. Pat. No. 3,330,859). It provides a composition which can successfully be used in a variety of substrates which exist, at one time or another, in an aqueous form. There is thus achieved the oxidative stabilization of polymer latices or other substrates requiring water dispersible antioxidants at some time during their manufacture such as ABS, polystyrene or impact polystyrene prepared by suspension polymerization, emulsion SBR, carboxylated SBR, SBR foam latex for carpet backing, natural rubber latex, acrylics, PVC, barrier resins based on acrylonitrile copolymers, nylon, soaps, textile finishes, emulsifiable cutting oils, etc.

The compositions of the present invention may be diluted several fold with water before addition to the substrate to be stabilized. Preferably such dilution is made with warm water, but at a temperature below the melting point of the dispersed stabilizer. In this dispersed form, the compositions may be added to a polymerization system before reaction or may be added at some subsequent stage to a latex prior to coagulation. It is also possible to add the composition to a polymer latex and to keep the composition in aqueous dispersed form until the latex is formed into the final product, such as a coating, film, fiber, etc.

The following examples presented for illustration and not limitation, will further serve to typify the nature of the present invention.

EXAMPLE 1

100.00 g of n-octadecyl $\beta$-(3,5-di-t-butyl-4-hydroxyphenyl)propionate (0.189 mole), m.p. 50°–55°C, was mixed with 10.00 g of oleic acid (0.035 mole) in a beaker. The resulting mixture was melted at 60°–65°C by heating the beaker for 20–30 minutes in a water bath at 70°–75°C. 1.44 g (98.8% pure) of sodium hydroxide (0.035 mole) was dissolved in 50.0 g of distilled water and the resultant sodium hydroxide solution was heated to 60°–65°C.

The melted phenolic antioxidant and oleic acid was added over a period of about 1 minute with vigorous stirring to the heated sodium hydroxide solution. Stirring of the warm mixture was continued for 1–2 minutes after the addition was completed. While stirring was continued, the resulting emulsion was quickly cooled to room temperature by placing the glass container containing the emulsion into a water bath at 20°–25°C. During the cooling period which took 10–15 minutes, the emulsion was occasionally stirred.

The 62% phenolic antioxidant dispersion prepared as above consists of an extremely fine dispersion of particles with particle sizes ranging from 1–3 microns in diameter. This dispersion exhibits a shelf storage stability at room temperature in excess of 1 year.

This dispersion has a milky-white appearance and a consistency of a thin paste. Its Brookfield Viscosity is 1,100 using spindle No. 4, 30 rpm (ASTMD-1824-66).

EXAMPLE 2

By essentially following the procedure of Example 1 and substituting the following phenolic antioxidants for octadecyl β-(3,5-di-t-butyl-4-hydroxyphenyl)propionate, there are obtained aqueous dispersions of these antioxidants:

a. n-dodecyl β-(3,5-di-t-butyl-4-hydroxyphenyl)-propionate
b. neo-dodecyl 3-(3,5-di-t-butyl-4-hydroxyphenyl)-propionate
c. n-hexyl 3,5-di-t-butyl-4-hydroxyphenylbenzoate
d. n-octadecyl α-(4-hydroxy-3,5-di-t-butylphenyl)-isobutyrate
e. n-octadecyl α-(4-hydroxy-3,5-di-t-butylphenyl)-propionate
f. n-octadecyl 3,5-di-t-butyl-4-hydroxyphenylacetate
g. n-octadecyl-β-(3-methyl-5-t-butyl-4-hydroxyphenyl)-propionate
h. n-octadecyl-β-(3-t-butyl-4-hydroxyphenyl) propionate
i. n-octadecyl 3,5-di-t-butyl-4-hydroxyphenylbenzoate
j. n-dodecyl 3,5-di-t-butyl-4-hydroxyphenylbenzoate.

EXAMPLE 3

By essentially following the procedure of Example 1 and substituting the following acids for oleic acid, there are obtained aqueous dispersions of octadecyl β-(3,5-di-t-butyl-4-hydroxyphenyl)propionate:

a. lauric acid
b. stearic acid
c. linoleic acid
d. palmitic acid.

EXAMPLE 4

100.00 g of n-octadecyl β-(3,5-di-t-butyl-4-hydroxyphenyl)propionate was mixed with 2.5 g of the anionic surfactant Triton GR-5 (Na-alkylaryl polyether sulfonate). This mixture was melted at 60°–70°C and then added over a period of 1 minute to a solution of 2.5 g of the surfactant and 62 g of distilled water in a beaker at 60°–70°C. The resulting mixture was vigorously stirred during addition and for 2–3 minutes after addition was complete. Then, while stirring was continued, the resulting emulsion was cooled to room temperature by placing the glass container containing the emulsion into a water bath at 20°–25°C. During the cooling period which took 10–15 minutes the emulsion was occasionally stirred.

The 60% phenolic antioxidant dispersion prepared as above consists of an extremely fine dispersion of particles. This dispersion has a milky-white appearance and a consistency of a thin paste. The dispersion exhibits a shelf storage stability at room temperature of approximately 1 month.

EXAMPLE 5

By essentially following the procedure of Example 4 and substituting the following anionic surfactants in Table I below for Triton GR-5, there were obtained aqueous dispersions with the shelf storage stabilities listed in the table.

TABLE I

| Anionic Surfactant | Shelf Storage Stability* |
|---|---|
| TRITON X-151 (Na-alkylaryl polyester sulfonate) | In excess of 2 months |
| Surfactant XQS-20 (phosphated acid foam) | In excess of 2 months |
| AC-PE-510 (Na-complex organic phosphate ester) | 2 months |
| NEKAL WS-25 (sulfonated aliphatic polyester) | 1 to 2 days |
| IGEPON-T-73 (Na-N-methyl-N-oleoyl taurate) | 3 to 4 hours |
| EMCOL P-10-59 (NH₃-alkylaryl sulfonate) | 2 to 3 hours |

*Room temperature storage

EXAMPLE 6

By essentially following the procedure of Example 4 and substituting the following nonionic surfactants in Table II below for Triton GR-5, there were obtained aqueous dispersions with the shelf storage stabilities listed in the table.

TABLE II

| Nonionic Surfactant | Shelf Storage Stability* |
|---|---|
| TRITON X-100 [alkylaryl polyether alcohol (octyl series)] | In excess of 2 months |
| IGEPON 10-630 [alkylaryl polyether alcohol (nonyl series)] | In excess of 2 months |
| Emulphor EL-260 (polyoxyethylated fatty oil or acid | In excess of 2 months |
| TRITON CF-54 [alkylaryl polyether alcohol (lower series)] | 1–2 hours |

*Room temperature storage

EXAMPLE 7

0.177 gms of the 62% dispersion prepared in Example 1 was diluted about five fold with warm distilled water at about 35°–40°C. The diluted dispersion was added with stirring to 132 gms of unstabilized ABS latex having a solids content of 38%. The polymer in the resulting mixture was coagulated by adding it slowly to 2 times its volume of 3% calcium chloride solution at 88°–90°C. The coagulated polymer powder was washed several times with hot distilled water at about 50°–60°C and finally dried in a forced draft oven at 50°–60°C for 5 hours.

The dried polymer should contain 0.22% of the phenolic antioxidant, n-octadecyl β-(3,5-di-t-butyl-4-hydroxyphenyl)propionate. It exhibited considerably greater resistance to oxidation and discoloration than unstabilized polymer when subjected to oven aging tests at elevated temperatures ranging from 190° to 450°F or when processed above its melting point in an extruder, injection molder or Extrusion Plastometer.

EXAMPLE 8

0.242 gms of the 62% dispersion prepared in Example 1 was diluted about five fold with warm distilled water at about 35°–40°C. The diluted dispersion was added with stirring to 308 ml of an unstabilized nitrile rubber modified acrylonitrile-methylacrylate copolymer latex. The latex was coagulated by adding it to 900 ml of a 0.5% aluminum sulfate solution at 70°C. The coagulated resin powder was washed twice with hot distilled water and dried at 50°C under house vacuum for 24 hours.

The dried polymer should contain 0.15% of the phenolic antioxidant, n-octadecyl β-(3,5-di-t-butyl-4-hydroxyphenyl)propionate. 5 grams of the dry polymer thus stabilized was charged to an Extrusion Plastomer at 200°C for 5 minutes and the molten polymer forced out through the standard orifice. The extrudate was only slightly yellow in appearance whereas a similar extrudate of unstabilized polymer was considerably yellower.

What is claimed is:

1. A storage stable aqueous dispersion of solid phenolic antioxidant comprising
   a. 10 to 80%, by weight, based on the weight of the total dispersion, of a compound of the formula

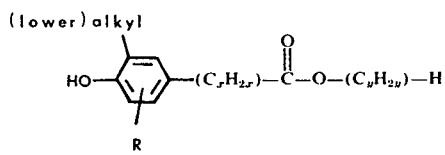

in which R is H or lower alkyl, $x$ has a value of from 0 to 6 inclusively and $y$ has a value of from 6 to 30 inclusively; and
   b. 2 to 30% by weight, based on the weight of compound I, of a fatty acid soap formed from a fatty acid and a base, or
   c. 1 to 30% by weight, based on the weight of compound I, of a nonionic or anionic surfactant; and
   d. water.

2. The dispersion of claim 1 wherein the compound of formula I is

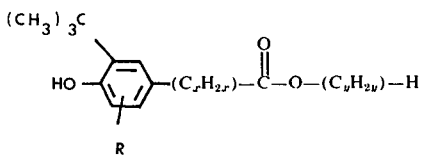

in which $x$ is 0 to 3 and $y$ has a value of from 12 to 30.

3. The dispersion of claim 1 wherein the compound of formula I is

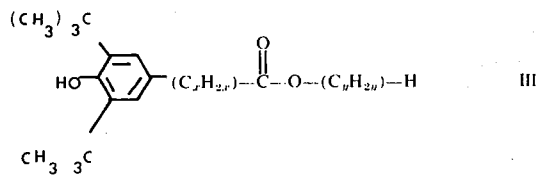

in which $x$ has a value of from 0 to 2 inclusively and $y$ has a value of from 12 to 18 inclusively.

4. The dispersion of claim 3 wherein
   a. the fatty acid is a member selected from the group consisting of oleic, lauric, myristic, palmitic, stearic, linoleic, linolenic, ricinoleic, and tall oil,
   b. the base is a member selected from the group consisting of sodium hydroxide, potassium hydroxide, ammonium hydroxide, triethanolamine and dimethylamine,
   c. the nonionic surfactant is a member selected from the group consisting of alkylaryl polyether alcohol (octyl series), alkylaryl polyether alcohol (nonyl series), and polyoxyethylated fatty oil or acid, and
   d. the anionic surfactant is a member selected from the group consisting of Na alkylaryl polyether sulfonate, Na alkylaryl polyester sulfonate, phosphated acid foam, and Na complex organic phosphate ester.

5. The dispersion of claim 4 wherein
   a. the compound of formula III is a member selected from the group consisting of n-dodecyl β-(3,5-di-t-butyl-4-hydroxyphenyl)-propionate, neododecyl 3-(3,5-di-t-butyl-4-hydroxyphenyl)-propionate, n-octadecyl α-(4-hydroxy-3,5-di-t-butylphenyl)-iso-butyrate, n-octadecyl α-(4-hydroxy-3,5-di-t-butylphenyl)propionate, n-octadecyl β-(3,5-di-t-butyl-4-hydroxyphenyl)propionate, and n-octadecyl 3,5-di-t-butyl-4-hydroxyphenylbenzoate,
   b. the fatty acid is oleic or stearic acid,
   c. the base is sodium or potassium hydroxide,
   d. the nonionic surfactant is a member selected from the group consisting of alkylaryl polyether alcohol (octyl series), alkylaryl polyether alcohol (nonyl series), and polyoxyethylated fatty oil or acid, and
   e. the anionic surfactant is a member selected from the group consisting of Na alkylaryl polyether sulfonate, Na alkylaryl polyester sulfonate, phosphated acid foam, and Na complex organic phosphate ester.

6. The dispersion of claim 4 wherein
   a. the compound of formula III is n-dodecyl β-(3,5-di-t-butyl-4-hydroxyphenyl)-propionate,
   b. the fatty acid is oleic acid, and
   c. the base is sodium hydroxide.

7. The dispersion of claim 4 wherein
   a. the compound of formula III is n-octadecyl β-(3,5-di-t-butyl-4-hydroxyphenyl)propionate,
   b. the fatty acid is oleic acid, and
   c. the base is sodium hydroxide.

8. The dispersion of claim 4 wherein
   a. the compound of formula III is n-octadecyl 3,5-di-t-butyl-4-hydroxyphenylbenzoate,
   b. the fatty acid is oleic acid, and
   c. the base is sodium hydroxide.

9. The dispersion of claim 4 wherein the water is distilled.

10. The dispersion of claim 4 wherein
   a. the concentration of the compound of formula III is from 50 to 70% by weight of the dispersion,
   b. the concentration of the fatty acid soap is from 5 to 15% by weight of the compound of formula III, and
   c. the concentration of the nonionic or anionic surfactant is from 3 to 10% by weight of the compound of formula III.

11. A process for making the dispersion of claim 1 which contains the fatty acid soap of clause (b) of claim 1, said process comprising
   a. preparing
      i. an oil phase by heating together the phenolic antioxidant of Formula I and a fatty acid to form a melt, and
      ii. a water phase by dissolving a soap-forming base, e.g., sodium, potassium or ammonium hydroxide, triethanolamine and dimethylamine, in water;
   b. then adding the oil phase to the water phase which is vigorously stirred and is maintained at a temperature above the temperature of the oil phase melt;
   c. continuing to stir for a brief period after addition is complete; and
   d. cooling the resulting mixture to approximately room temperature.

12. A process for making the dispersion of claim 1 which contains the nonionic or anionic surfactant of clause (c) of claim 1, said process comprising
   a. adding an oil phase melt of the phenolic antioxidant of Formula I to a water phase which is vigorously stirred and is maintained at a temperature above the temperature of the oil phase, a nonionic or anionic surfactant being initially present in either or both of the oil phase melt and the water phase;
   b. continuing to stir for a brief period after addition is complete; and
   d. cooling the resulting mixture to approximately room temperature.

* * * * *